United States Patent [19]
Pulvirenti et al.

[11] Patent Number: 5,874,850
[45] Date of Patent: Feb. 23, 1999

[54] MOS VOLTAGE ELEVATOR OF THE CHARGE PUMP TYPE

[75] Inventors: Francesco Pulvirenti, Acireale; Roberto Gariboldi, Lacchiarella, both of Italy

[73] Assignee: STMicroelectronics S.r.l., Agrate Brianza, Italy

[21] Appl. No.: 919,592

[22] Filed: Aug. 5, 1997

Related U.S. Application Data

[63] Continuation of Ser. No. 513,293, Aug. 10, 1995, abandoned.

[30] Foreign Application Priority Data

Aug. 12, 1994 [EP] European Pat. Off. .............. 94830402

[51] Int. Cl.$^6$ ...................................................... G05F 1/10
[52] U.S. Cl. .......................... 327/536; 327/537; 363/60; 363/61; 307/110
[58] Field of Search ..................................... 327/536, 537, 327/543, 548; 307/110; 363/60, 61, 147

[56] References Cited

U.S. PATENT DOCUMENTS

| | | | |
|---|---|---|---|
| 4,029,973 | 6/1977 | Kobayashi et al. | 307/264 |
| 4,068,295 | 1/1978 | Portmann | 363/60 |
| 4,740,715 | 4/1988 | Okada | 327/537 |
| 4,961,007 | 10/1990 | Kumanoya et al. | 327/543 |
| 4,982,317 | 1/1991 | Mauthe | 363/60 |
| 5,093,586 | 3/1992 | Asari | 327/536 |
| 5,172,013 | 12/1992 | Matsumura | 327/537 |
| 5,247,208 | 9/1993 | Nakayama | 327/537 |
| 5,266,842 | 11/1993 | Park | 327/537 |
| 5,436,587 | 7/1995 | Cernea | 327/536 |
| 5,444,362 | 8/1995 | Chung et al. | 323/313 |
| 5,519,557 | 5/1996 | Kopera, Jr. et al. | 361/84 |

FOREIGN PATENT DOCUMENTS a-2 261 307   5/1923   United Kingdom ............ G11C 11/40

Primary Examiner—Timothy P. Callahan
Assistant Examiner—Jung Ho Kim
Attorney, Agent, or Firm—Wolf, Greenfield & Sacks, P. C.

[57] ABSTRACT

A charge pump MOS voltage booster has reduced voltage drops and ripple. This voltage booster is advantageously used in two applications. The voltage has four MOS transistors instead of diodes in a classical voltage booster, which exhibit an undesired voltage drop. The voltage booster also has an oscillator with two outputs and two corresponding charge transfer capacitors. In this manner, the undesired voltage drops and ripple are reduced without complicating the circuitry structure.

19 Claims, 3 Drawing Sheets

MOS VOLTAGE ELEVATOR OF THE CHARGE PUMP TYPE

This application is a continuation of application Ser. No. 08/513,293, filed Aug. 10, 1995, abandoned.

BACKGROUND OF THE INVENTION

1. Field of the Invention

The present invention relates to a charge pump MOS voltage booster and to two applications where said type of booster can find advantageous use.

2. Discussion of the Related Art

The increasing need for devices which operate in equipment having one continuous very low power voltage (down to 1V), such as telecommunications line equipment, portable units, etc., requires efficient and simple continuous voltage boosters.

One well known structure of a charge pump doubler is illustrated in FIG. 1. It includes an oscillator OSC typically with square wave and powered with a continuous power voltage VS and connected to ground GND and having an output O. The output O is connected to the first terminal of a first charge transfer capacitor TC1. The second terminal of the charge transfer capacitor TC1 is connected to the cathode of a diode D2. The anode of the diode D2 is connected to the power voltage VS. The cathode of the diode D2 is also connected to the anode of another diode D1. The cathode of the diode D1 is connected to the output OUT of the doubler and to the second terminal of a charge accumulation capacitor SC whose first terminal is connected to ground GND.

In this circuit the output voltage (without load) is equal to double the power voltage decreased by double the starting voltage (approximately 0.7V) of the diodes D1 and D2. When the power voltage is very low, e.g. between 1.2V and 3.5V, this reduction becomes significant and unacceptable.

To solve this problem it has bee proposed, e.g. in French patent application FR-A-2 321 144, to replace the diodes D1 and D2 with two MOS transistors M1 and M2 as shown in FIG. 2. Naturally threshold transistors M1 and M2 need to be appropriately piloted. This was achieved, as shown in said document, by means of two other MOS transistors M3 and M4.

The circuit of FIG. 2 solves the problem of voltage drop on the diodes since the voltage drop on the channel of the MOS transistors is extremely small but exhibits, as also the circuit of FIG. 1, a certain ripple at the output OUT.

SUMMARY OF THE INVENTION

The purpose of the present invention is to supply a voltage booster with simple, efficient circuitry and without large voltage drops in relation to the theoretical high value and with ripple limited at the output.

This purpose is achieved through the doubler having the characteristics set forth in claims 1 or 3 or the booster having the characteristics set forth in claim 6. Additional advantageous aspects of the present invention are set forth in the dependent claims.

By using an oscillator in the doubler or elevator having two outputs in phase opposition and two corresponding charge transfer capacitors in addition to a bridge of controlled switches, it is possible to charge the accumulation capacitor during a first half-period through one of the two capacitors and during the following half-period charge the accumulation capacitor through the other of the two capacitors and reduce ripple at the output.

Advantageously, instead of using four additional MOS transistors, the second charge transfer capacitor can be connected directly to the first four transistors symmetrically in relation to the first charge transfer capacitor.

In accordance with another aspect the present invention concerns also an electrical circuit in accordance with claim 13 and a voltage regulator in accordance with claim 14, both comprising and using such a voltage booster.

BRIEF DESCRIPTION OF THE DRAWINGS

The invention is clarified by the description given below with reference to the annexed drawings.

In the drawings.

DETAILED DESCRIPTION

Figure 1:
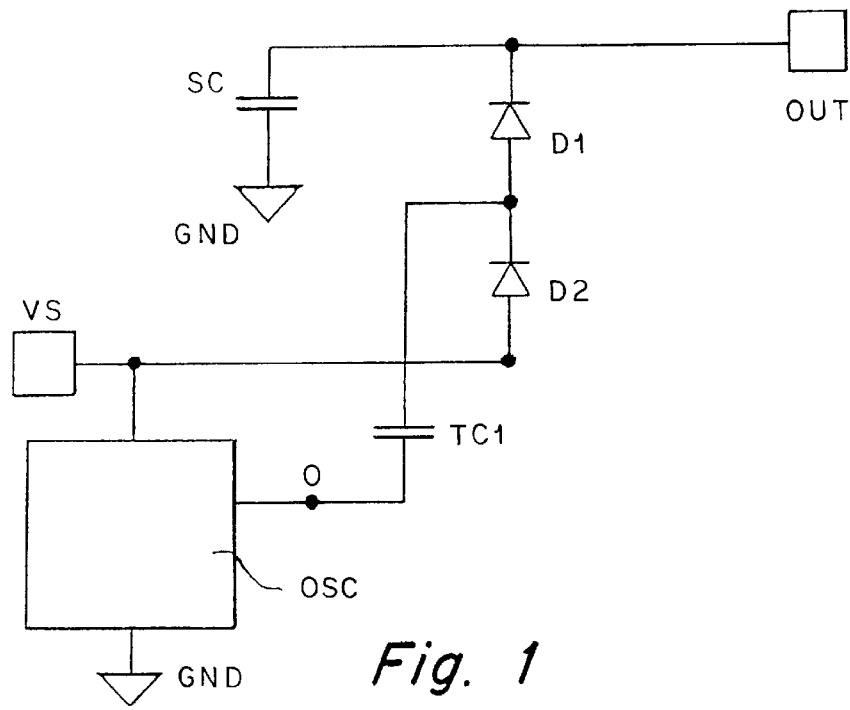
FIG. 1 shows a diode voltage booster in accordance with the known art.
Figure 2:
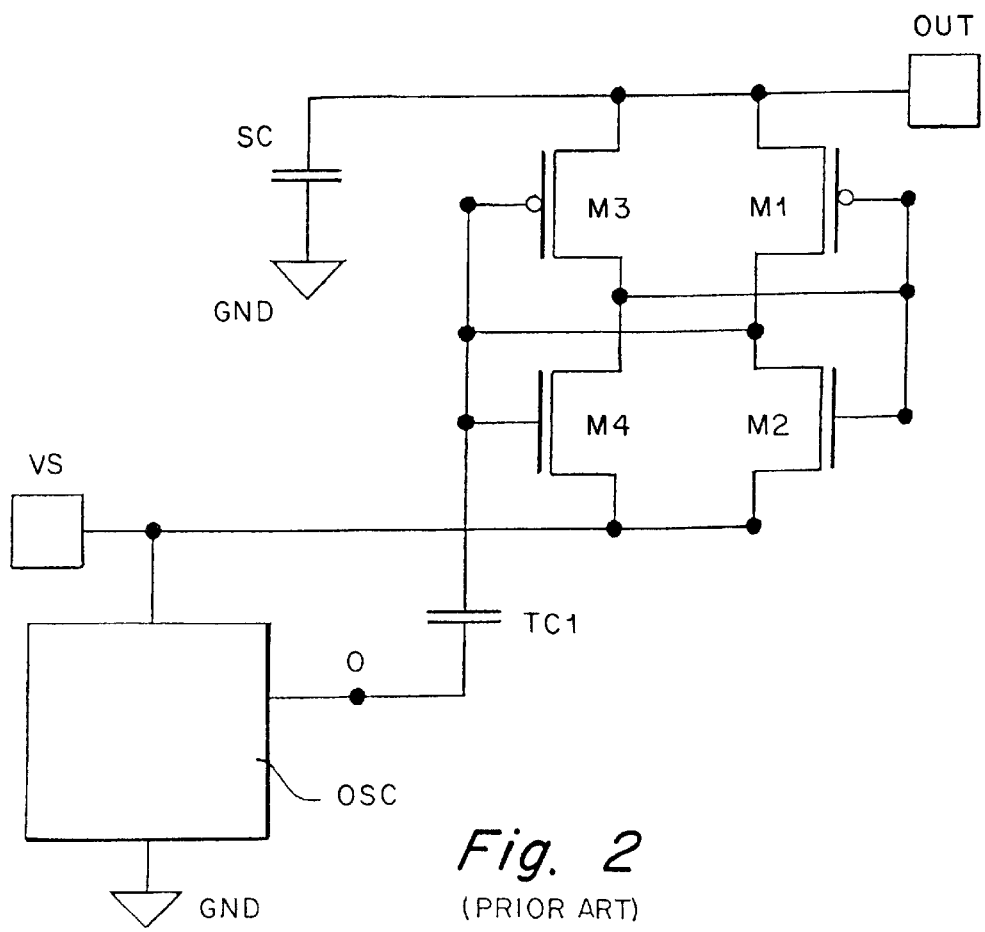
FIG. 2 shows an MOS-transistor voltage booster in accordance with the known art.
Figure 3:
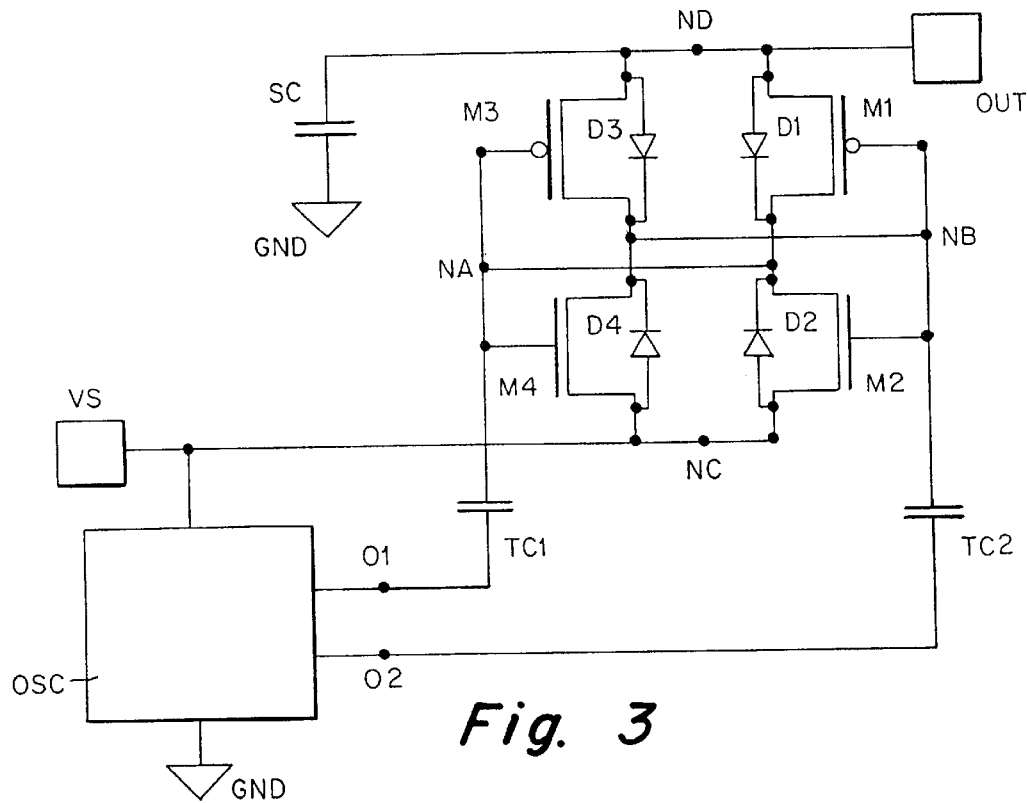
FIG. 3 shows a voltage doubler in accordance with the present invention.

The circuit of FIG. 3 is quite similar to that of FIG. 2 but differs therefrom in some important elements.

The oscillator OSC exhibits, in addition to the first output 01, a second output 02 in phase opposition in relation to the first. The second output is connected to the first terminal of a second charge transfer capacitor TC2. The second terminal of said second capacitor is connected directly to the four transistors M1,M2,M3,M4 symmetrically in relation to the first capacitor TC1.

The transistors M1,M2,M3,M4 thus give rise to two inverters connected together in a loop so as to form a flip-flop having respective inputs connected to the second terminals of the capacitors TC1 and TC2 which are negative power terminals connected together to the voltage VS and positive power terminals connected together to the second terminal of the capacitor SC.

The signal generated by the oscillator OSC varies between the potential of the reference GND a nd the potential of the continuous power voltage VS in accordance with a square wave both at the output 01 and the output 02.

Such an oscillator can include an oscillator having a single output referred to the potential reference GND, in particular ground, from an inverting buffer and from a non-inverting buffer having virtually equal delays.

FIG. 3 shows the bulk diodes D1,D2,D3,D4 of the four MOS transistors M1,M2,M3,M4 respectively. The cathodes of D1 and D3 are connected to the output OUT of the doubler and the anodes of D2 and D4 are connected to the continuous power voltage VS. These connections are very important for correct starting of the circuit and subsequent rated operation as explained more clearly in the following description.

Naturally, considering the perfect symmetry of the circuit thus achieved, the inverters including the transistors M1,M2, M3,M4 preferably must be equal.

To explain the operation of this circuit it is necessary to follow the evolution of the voltage at the output OUT of the doubler from the time power voltage is applied to achievement of rated operating voltage.

At the instant the power voltage is applied, the accumulation capacitor SC is discharged and the output moves to potential VS−2 * VD, where VD is a starting voltage of the bulk diodes of the MOS transistors, approximately 0.7V.

During this first phase the four MOS transistors are all off and the capacitor SC charges through the bulk diodes. When the difference between voltage at output and power voltage becomes greater than the threshold voltage of the MOS transistors, the transistors M1,M2,M3,M4 begin to conduct and cooperate in "pumping" charge into the capacitor SC until completely replacing the bulk diodes at rated operation.

Operation during the transient is as follows:

During the half-period in which the output 01 of the oscillator OSC is low, i.e. grounded, the first capacitor TC1 charges through the diode D2. While the output 02 is high, the charge transfer capacitor TC2 supplies its energy to the capacitor SC through the diode D3.

During the half-period in which the output 01 of the oscillator OSC is high, i.e. at power potential, the capacitor TC1 supplies its energy to the capacitor SC through the diode D1. While the output 02 is low, the charge transfer capacitor TC2 charges through the diode D4.

In the absence of the MOS transistors, with only a bridge of the diodes (D1,D2,D3,D4), the voltage at the output OUT would rise to:

$$2*VS-2*VD-2*RD*IL-IL*T/C; \qquad [1]$$

where RD is the series resistance of the bulk diodes, IL is the average current absorbed by the load, T is the period of the square wave generated by the oscillator OSC, and C is the capacity of the capacitors TC1 and TC2, which are assumed to be equal. This is true only if SC>>TC1 and SC>>TC2, so as to disregard ripple.

The first of the three contributions subtracted is due to the diode starting voltage and is present even when no current is absorbed by the load, e.g. in "High Side Driver" applications where the load to be piloted is a MOS transistor, i.e., a pure capacity.

The second contribution is due to the potential drop in the series resistance of said diodes. By appropriately dimensioning the diodes, this contribution is almost always negligible.

The third contribution is due to the loss of charges of the capacitors TC1 and TC2. This contribution cannot be eliminated and should be allowed for if the charge transfer capacitors are integrated, or it can be minimized if it is possible to connect very large discrete capacitors outside the chip. In any case, for applications in which no average current is absorbed on the load, this contribution is zero.

Rated operation is as follows:

During the half-period in which the output 01 is low, i.e. grounded, the nodes NA and NB are at potential VS and VOUT respectively, M1 and M4 are off, M2 and M3 are on. In this condition, the first capacitor TC1 charges through the N-channel MOS transistor M2 and the charge transfer capacitor TC2 charges the capacitor SC through the P-channel MOS transistor M3.

During the half-period in which the output 01 is high, i.e. at power potential, the nodes,NA and NB are at potential VOUT and VS respectively, M1 and M4 are on, M2 and M3 are off. In this condition, the first capacitor TC1 charges the capacitor SC through the P-channel MOS transistor M1 and the charge transfer capacitor TC2 charges through the N-channel MOS transistor M4.

In rated operation, assuming the output resistance of the oscillator OSC to be null, the output voltage will be:

$$2*VS-2*RDS\_ON*IL-IL*T/C; \qquad [2]$$

where RDS_ON is the series resistance of the MOS transistors, which are assumed to be equal.

From a comparison of formulas [1] and [2] the advantage achieved by use of the MOS transistors is clear. This advantage is especially relevant in applications in which, in rated operation, the term IL becomes null, e.g. when the load to be piloted is an MOS transistor.

During the initial transient operating condition, when the node NA goes low, the bulk diode D2 of the N-channel MOS transistor M2 (this applies also to D4 and M4) goes into conduction triggering an NPN parasite transistor which has for emitter the drain diffusion of the N-channel MOS transistor M2, for base the bulk diffusion of the N-channel MOS transistor M2, and for collector the pocket containing the N-channel MOS transistor M2. If the pocket of the N-channel MOS transistor M2 is polarized at the voltage VOUT the intervention of this parasite transistor would discharge the capacitor SC and prevent reaching of rated condition. Hence, if the circuit is integrated in the same chip, it is advisable to place the transistors M1, M2, M3, M4 in separated pockets and polarize the pocket of the N-channel MOS transistors at the same bulk potential, i.e. VS.

When the node NA goes high the bulk diode D1 of the P-channel MOS transistor M1 (this also applies for D3 and M3) goes into conduction triggering a parasite PNP transistor which has for emitter the drain diffusion of the P-channel MOS transistor M1, for base the pocket of the P-channel MOS transistor M1, and for collector the substrate and the insulation. The presence of this parasite transistor would slow reaching of the rated condition. Therefore it is advisable to minimize said undesired effect by surrounding the MOS transistors M1 and M2 with a deep highly doped type N diffusion.

Another important point to be mentioned concerns dimensioning of the four MOS transistors and the output resistance of the oscillator OSC.

The MOS transistors should be constructed allowing first for the RDS_ON because the voltage drop on it is to be subtracted from the output voltage, but without excessive reduction of this parameter which causes an opposite increase in the cross current lost during each switching and affects conversion efficiency.

In addition, in rated operating condition, if the transfer capacitors TC1 and TC2 are sufficiently large that the charge lost can be considered negligible, the potential at the nodes NA and NB during a rising or falling front will be determined by the resistive divider made up of the RDS_ON of the MOS transistors and the output resistance of the oscillator OSC. Normally even the oscillator OSC has its output stage provided by MOS inverters.

Therefore, assuming half the switching threshold of the inverters made up of the pairs of MOS transistors M1,M2 and M3,M4, for said inverters to be able to switch, the oscillator must have an output resistance smaller than the RDS_ON of the MOS transistors.

It must also be noted that the MOS transistors work in the voltage space between VOUT and VS and must be constructed in such a manner as to withstand this potential difference while the pocket containing them must hold the highest voltage VOUT.

Figure 4:
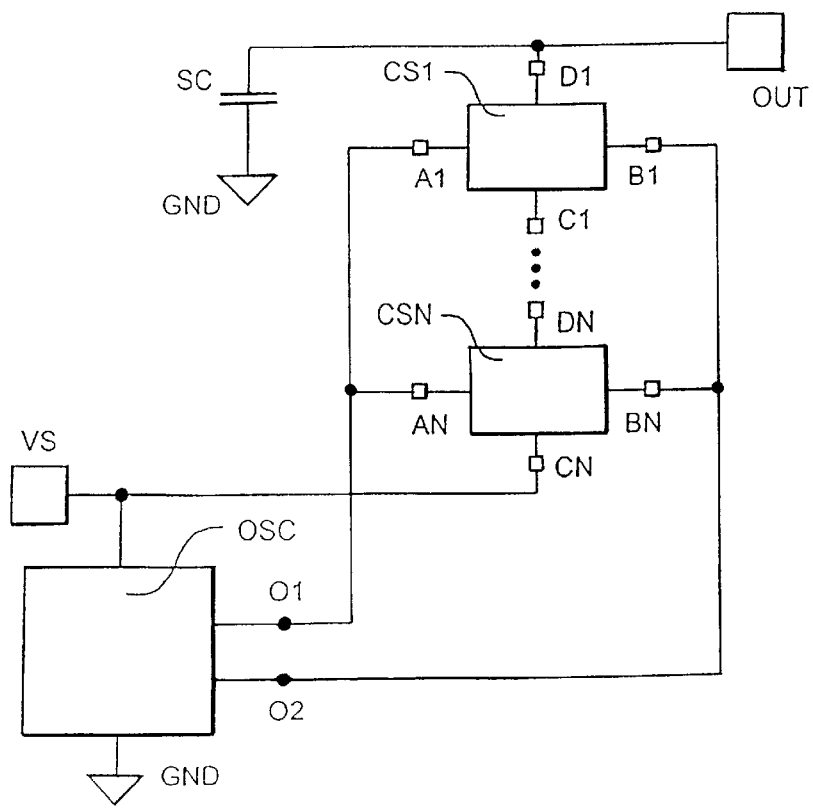
FIG. 4 shows a voltage booster in accordance with the present invention.

FIG. 4 shows a block diagram of a voltage booster in accordance with the present invention also based on an oscillator OSC having two outputs 01 and 02 in phase opposition and at least one pair of charge transfer capacitors so that the accumulation capacitor SC is loaded during both half-periods of the wave, usually square, generated by the oscillator OSC.

This booster includes generically N loading sections CS indicated as CS 1-CSN. In the circuit of FIG. 4, the voltage at the output OUT is equal to N+1 times the continuous power voltage VS, hence in the case of a single loading section the booster will be a doubler.

Figure 5:
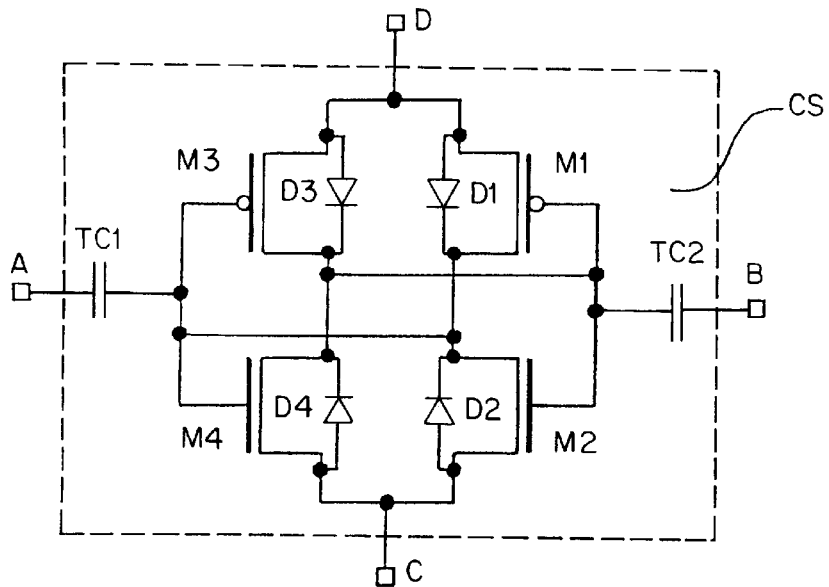
FIG. 5 shows a loading section to be used in the voltage booster of FIG. 4.

The generic loading section CS is illustrated in FIG. 5 and is a device with four terminals, i.e. a first side terminal A, a second side terminal B, a power input terminal C, and a charge output terminal D. All the first side terminals A1-AN are connected to the output 01 and all the second side terminals B1-BN are connected to the output 02. In the case of a single loading section CS the terminal D is connected to the output OUT and to the capacitor SC and the terminal C to a potential reference, in the case of FIG. 4, the continuous power voltage VS. In the case of N loading sections CS1-CSN these are connected in series by the input terminals C1-CN and the output terminals D1-DN. The first output terminal (D1) of the series connection is connected to the output OUT and to the capacitor SC, and the last input terminal (CN) of the series connection is connected to a potential reference, in the case of FIG. 4, the continuous power voltage VS.

Each of the loading sections CS includes:
- a first charge transfer capacitor TC1 and a second charge transfer capacitor TC2 having first terminals connected to the first A and second B side terminals respectively, and
- two inverters connected together in a loop in such a way as to form a flip-flop having respective inputs connected to second terminals of the first charge transfer capacitor TC1 and of the second charge transfer capacitor TC2, negative power terminals connected together to the power input terminal C and positive power terminals connected together to the charge output terminal D.

The first inverter is made up of the MOS transistors M1 and M2 and the second inverter of the MOS transistors M3 and M4. Again in FIG. 5 the bulk diodes D1,D2,D3,D4 are shown (basically for operation of the circuit), the cathodes of the diodes D1 and D3 are connected to the charge output terminal D, while the anodes of the diodes D2 and D4 are connected to the power input terminal C.

In FIG. 4, a terminal of the capacitor SC is connected to ground GND. Naturally a different potential reference could be chosen with no consequence on the potential at the output OUT.

Again in FIG. 4, the continuous power voltage VS is supplied as an input both to the oscillator OSC and the terminal CN. Again in this case the terminal CN could be connected to a different potential reference. The output voltage would then be equal to N times the continuous power voltage VS of the oscillator OSC increased by the reference potential.

As already mentioned, there are various electrical circuits which require voltage booster circuits for the environment in which they operate.

A first example are Flash EPROM memory devices. These devices require a relatively low read voltage, e.g. 3 to 5V, but relatively high programming and reading voltages, 12V. Naturally, it is rather inconvenient to have, only for these devices, a 12V power source, and it is convenient to insert a booster in the memory device.

A second example are voltage regulators with a low voltage drop between input and output, and an MOS power transistor as an output regulation element.

Figure 6:
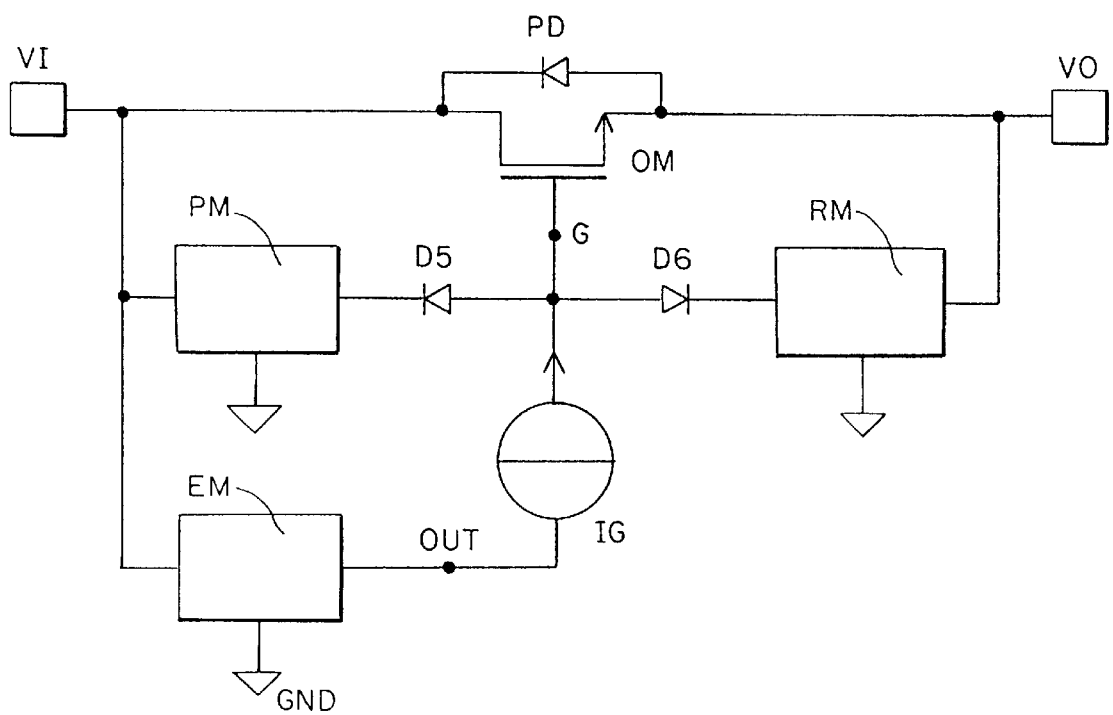
FIG. 6 shows a voltage regulator in accordance with the present invention.

Such a regulator is shown in FIG. 6. This is a device basically with three terminals, an input terminal VI, an output terminal VO, and a potential reference terminal GND which is usually connected to ground.

The input terminal VI is connected to the drain terminal of a P-channel MOS power transistor OM, and the output terminal VO is connected the source terminal of the P-channel MOS power transistor OM. In parallel with the channel of the P-channel MOS power transistor OM is a protection diode PD.

The output terminal VO is also connected to regulation means RM whose output is connected to the gate terminal G of the P-channel MOS power transistor OM through a diode D6.

The input terminal VI can also be connected to protection means PM against current overloads whose output is again connected to the gate terminal G of the P-channel MOS power transistor OM through another diodes D5.

The input terminal VI must also be connected to voltage booster means EM whose output OUT is connected to the gate terminal G of the P-channel MOS power transistor OM through a current generator IG. The current generator fulfils principally a function of limiting the current generated by the voltage booster means EM and also permits letting the potential of the gate terminal G vary.

The voltage booster means EM provides the gate terminal G with a potential greater at least than the threshold voltage present on the output terminal VO by at least one volt. If the regulator has a low voltage drop, the potential on the output terminal VO will be greater only by a few tenths of a volt and would not be sufficient to pilot the gate terminal G of the P-channel MOS power transistor OM. Therefore, the voltage booster is needed.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by example only and is not intended as limiting. The invention is limited only as in the following claims and the equivalents thereto.

What is claimed is:

1. A voltage doubler receiving at an input a continuous power voltage and supplying at an output a voltage having a value virtually double that of said continuous power voltage, the voltage doubler comprising:
   a. an oscillator, powered by said continuous power voltage having a first output, and a second output in phase opposition to the first output.
   b. a charge accumulation condenser having a first terminal connected to a potential reference and a second terminal connected to the output of the doubler,
   c. a first charge transfer condenser having a first terminal connected to said first output of said oscillator, and
   d. two CMOS inverters connected together in a loop to form a flip-flop having a first input connected to a second terminal of said first condenser, negative power terminals connected together to said continuous power voltage and positive power terminals connected together to said second terminal of said charge accumulation condenser, and
   e. a second charge transfer condenser having a first terminal connected to said second output of said oscillator and a second terminal connected to a second input of said inverters.

2. The voltage doubler in accordance with claim 1, wherein said inverters include MOS transistors which are virtually equal, and wherein corresponding bulk terminals of said MOS transistors are connected in such a manner as to create a one-way conduction path between said negative terminals and said positive terminals of said inverters.

3. A voltage doubler receiving at an input a continuous power voltage and supplying at an output a voltage having a value virtually double that of said continuous power voltage, the voltage doubler comprising:

a. an oscillator powered by said continuous power voltage and having two outputs in phase opposition, b. a charge accumulation condenser having a first terminal connected to a potential reference and a second terminal connected to the output of the doubler, c. a first charge transfer condenser and a second charge transfer condenser having first terminals respectively connected to the outputs of said oscillator, d. a bridge comprising four transistors and corresponding bulk diodes of the transistors, the transistors being arranged so that the four bulk diodes form a bridge, said bridge having a positive terminal connected to the second terminal of said charge accumulation condenser, a negative terminal connected to said continuous power voltage and two intermediate terminals respectively connected to second terminals of said first charge transfer condenser and said second charge transfer condenser, and the four transistors hiving principal conduction paths connected in parallel with said tour diodes and control terminals connected to the first charge transfer condenser and the second charge transfer condenser in such a way as to lower a voltage drop along branches of the bridge when the doubler reaches a steady state.

4. The voltage doubler in accordance with claim 3, wherein said four transistors are MOS type and are virtually equal.

5. A voltage booster receiving at an input a continuous power voltage and supplying at an output a voltage higher than the continuous power voltage, the voltage booster comprising:

a. an oscillator powered by said continuous power voltage, having two outputs in phase opposition, b. a charge accumulation condenser having a first terminal connected to a first potential reference and a second terminal connected to the output of the booster, and c. at least one charging section having a charge output terminal, a power input terminal, a first side terminal and a second side terminal respectively connected to the outputs of said oscillator, and said at least one charging section being connected in series with the output terminal connected to the second terminal of said charge accumulation condenser and the input terminal connected to the continuous power voltage, wherein the at least one charging section comprises:

a first charge transfer condenser and a second charge transfer condenser having respective first terminals connected to said first and second side terminals, and a bridge of four controlled switches having two intermediate terminals connected to respective second terminals of said first charge transfer condenser and said second charge transfer condenser a negative terminal connected to said power input terminal and a positive terminal connected to said charge output terminal, and wherein the value of the voltage of the output corresponds to said continuous power voltage plus the product of said continuous power voltage and a number of the at least one charging section.

6. The voltage booster in accordance with claim 5, wherein the switches of said bridge form two CMOS inverters connected together in a loop to form a flip-flop, having inputs connected to respective second terminals of said first charge transfer condenser and said second charge transfer condenser, negative power terminals connected together to said power input terminal and positive power terminals connected together to said charge output terminal.

7. The voltage booster in accordance with claim 6, wherein said switches include MOS transistors.

8. The voltage booster in accordance with claim 7, wherein corresponding bulk terminals of said MOS transistors are connected in such a way as to create a one-way conduction path between said power input terminal and said charge output terminal when the switches are not conducting.

9. The voltage booster in accordance with claim 6, wherein said inverters are virtually equal.

10. The voltage booster in accordance with claim 5, wherein said power input terminal is connected to said continuous power voltage.

11. An electrically programmable and delectable non-volatile memory device of a type powered with a low voltage comprising:

a. an oscillator powered by said low voltage, having two outputs in phase opposition, b. a charge accumulation condenser having a first terminal connected to a first potential reference and a second terminal connected to an output of the memory device and c. at least one charging section having a charge output terminal, a power input terminal, a first side terminal and a second side terminal respectively connected to the outputs of said oscillator and said at least one charging section being connected in series with the output terminal connected to the second terminal of said charge accumulation condenser and the input terminal connected to the low voltage, wherein the at least one charging section comprises:

a first charge transfer condenser and a second charge transfer condenser having respective first terminals connected to said first and second side terminals, and a bridge of four controlled switches having two intermediate terminals connected to respective second terminals of said first charge transfer condenser and said second charge transfer condenser, a negative terminal connected to said power input terminal and a positive terminal connected to said charge output terminal, and wherein the value of the voltage of the output corresponds to said low voltage plus the product of said low voltage and a number of the at least one charging section.

12. A voltage regulator having a low voltage drop between an input and an output of a type having a MOS power transistor as an output regulation element and a voltage booster means having an output coupled to a control terminal of said power transistor to maintain a conduction condition on the power transistor when operating conditions of the regulator change, wherein the voltage booster means includes:

a. an oscillator powered by a continuous power voltage, having two outputs in phase opposition, b. a charge accumulation condenser having a first terminal connected to a first potential reference and a second terminal connected to the output of the voltage booster means, and c. at least one charging section having a charge output terminal, a power input terminal, a first side terminal and a second side terminal respectively connected to the outputs of said oscillator and said at least one charging section being connected in series with the output terminal connected to the second terminal of said charge accumulation condenser and the input terminal connected to the continuous power voltage, wherein the at least one charging section comprises:

a first charge transfer condenser and a second charge transfer condenser having respective first terminals connected to said first and second side terminals, and a bridge of four controlled switches having two intermediate terminals connected to respective second terminals of said first charge transfer condenser and said second charge transfer condenser, a negative terminal connected to said power input terminal and a positive terminal connected to said charge output terminal, and wherein the value of the voltage of the output corresponds to said continuous power voltage plus the product of said continuous power voltage and a number of the at least one charging section.

13. The voltage multiplier of claim 12, wherein the output means includes a charge accumulation condenser connected between the multiplied voltage and a potential reference.

14. The voltage multiplier of claim 13, wherein the output voltage is outputted at the connection between the charge accumulation condenser and the multiplied voltage.

15. The voltage multiplier of claim 14, wherein the oscillator is powered by the constant voltage.

16. A voltage multiplier receiving a constant voltage comprising:

an oscillator providing two outputs in phase opposition, multiplying means connected to the constant voltage and the oscillator outputs for generating a multiplied voltage which is a multiple of the constant voltage; and output means receiving the multiplied voltage for outputting a substantially constant output voltage which is a multiple of the constant voltage;

wherein the multiplying means includes:

at least one first charge transfer condenser connected to one output of the oscillator;

at least one second charge transfer condenser connected to another output of the oscillator;

at least one bridge circuit of four controlled switches having an input coupled to the constant voltage, an output providing the multiplied voltage, and at least two side inputs respectively coupled to the at least one first charge transfer condenser and the at least one second charge transfer condenser.

17. The voltage multiplier of claim 16, wherein:

the at least one first charge transfer condenser includes a plurality of first charge transfer condensers, each being connected to said one output of the oscillator;

the at least one second charge transfer condenser includes a plurality of second charge transfer condensers corresponding to the plurality of first charge transfer condensers, each of the second charge transfer condensers being connected to said another output of the oscillator;

the at least one bridge circuit includes a plurality of series connected bridge circuits corresponding to the plurality of first charge transfer condensers and plurality of second charge transfer condensers, each bridge circuit having two side inputs connected to a respective first charge transfer condenser and a respective second charge transfer condenser.

18. The voltage multiplier of claim 16, wherein the at least one bridge circuit includes:

four diodes in a bridge arrangement such that a positive terminal is connected to the output of the bridge circuit, a negative terminal is connected to the input of the bridge circuit, and two intermediate terminals are connected to the side inputs of the bridge circuit; and four transistors having principal conduction paths connected in parallel with the four diodes and control terminals connected to the side inputs.

19. The voltage multiplier of claim 17, wherein each of the plurality of series connected bridge circuits includes:

four diodes in a bridge arrangement such that a positive terminal is connected to the output of the bridge circuit, a negative terminal is connected to the input of the bridge circuit, and two intermediate terminals are connected to the side inputs of the bridge circuit; and four transistors having principal conduction paths connected in parallel with the four diodes and control terminals connected to the side inputs.

* * * * *

(12) EX PARTE REEXAMINATION CERTIFICATE (10202nd)
United States Patent
Pulvirenti et al.

(10) Number: US 5,874,850 C1
(45) Certificate Issued: Jun. 26, 2014

(54) MOS VOLTAGE ELEVATOR OF THE CHARGE PUMP TYPE

(75) Inventors: Francesco Pulvirenti, Acireale (IT); Roberto Gariboldi, Lacchiarella (IT)

(73) Assignees: SGS-Thomson Microelectronics S.r.l., Agrate Brianza (IT); Consorzio per la Ricerca Sulla Microelettronica Nel Mezzogiorno, Catania (IT)

Reexamination Request:
No. 90/012,777, Jan. 30, 2013

Reexamination Certificate for:
Patent No.:     5,874,850
Issued:         Feb. 23, 1999
Appl. No.:      08/919,592
Filed:          Aug. 5, 1997

Related U.S. Application Data

(63) Continuation of application No. 08/513,293, filed on Aug. 10, 1995, now abandoned.

(30) Foreign Application Priority Data

Aug. 12, 1994 (EP) ..................................... 94830402

(51) Int. Cl.
*H02M 3/07* (2006.01)
*H02M 3/04* (2006.01)

(52) U.S. Cl.
USPC ............. 327/536; 307/110; 327/537; 363/60; 363/61

(58) Field of Classification Search
None
See application file for complete search history.

(56) References Cited

To view the complete listing of prior art documents cited during the proceeding for Reexamination Control Number 90/012,777, please refer to the USPTO's public Patent Application Information Retrieval (PAIR) system under the Display References tab.

*Primary Examiner* — Eric B Kiss

(57) ABSTRACT

A charge pump MOS voltage booster has reduced voltage drops and ripple. This voltage booster is advantageously used in two applications. The voltage has four MOS transistors instead of diodes in a classical voltage booster, which exhibit an undesired voltage drop. The voltage booster also has an oscillator with two outputs and two corresponding charge transfer capacitors. In this manner, the undesired voltage drops and ripple are reduced without complicating the circuitry structure.

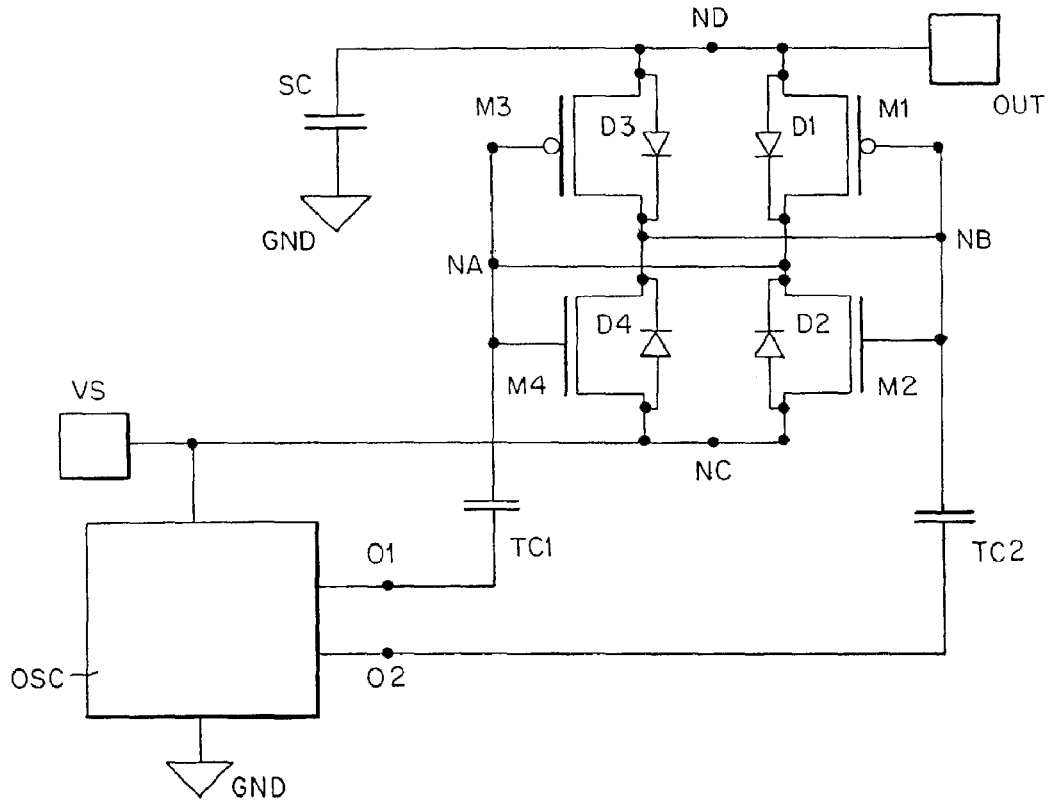

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 5-7, 9, 11 and 16 is confirmed.

New claims 20-23 are added and determined to be patentable.

Claims 2-4, 8, 10, 12-15 and 17-19 were not reexamined.

*20. The voltage doubler of claim 1, wherein said inverters include MOS transistors which are placed in separated pockets.*

*21. The voltage doubler of claim 20, wherein the pocket of at least two N-channel MOS transistors are polarized at the same bulk potential.*

*22. The voltage doubler of claim 1, wherein said inverters include at least two MOS transistors which are surrounded with a deep highly doped type N diffusion.*

*23. The voltage doubler of claim 1, wherein said inverters include MOS transistors which have a series resistance greater than the output resistance of said oscillator.*

* * * * *